May 23, 1939.  A. VINCENZONI  2,159,462
TRANSMISSION GEAR HAVING AN AUTOMATICALLY VARIABLE TRANSMISSION RATIO
Filed March 24, 1937  2 Sheets-Sheet 1
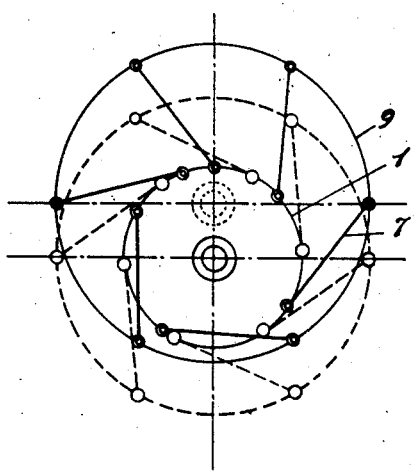
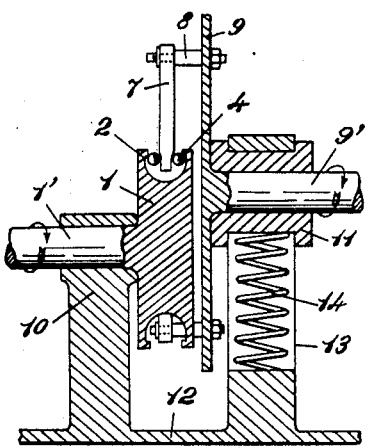
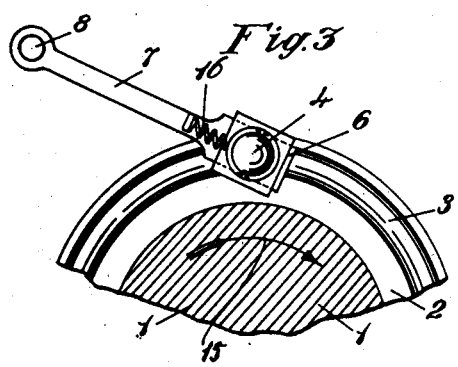
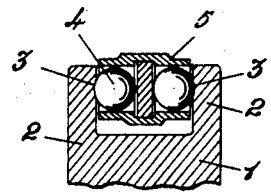
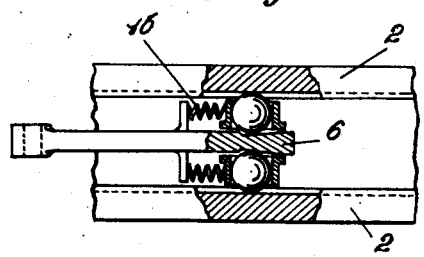

Patented May 23, 1939

2,159,462

UNITED STATES PATENT OFFICE 2,159,462

TRANSMISSION GEAR HAVING AN AUTO-MATICALLY VARIABLE TRANSMISSION RATIO

Alvaro Vincenzoni, Terni, Italy

Application March 24, 1937, Serial No. 132,836
In Italy April 1, 1936

1 Claim. (Cl. 74—113)

This invention relates to a variable speed gear comprising a rotary driven member and means connecting them comprising a plurality of drag links in which the ratio of transmission is automatically varied by relative displacement of the two members from a position of maximum eccentricity, corresponding to a maximum ratio of transmission, through intermediate eccentric positions into a concentric position, one of said members being carried by a resilient member which tends to hold it in the position of greatest eccentricity but is deformed in accordance with the resistance to be overcome and thus varies the relative eccentricity of the two members.

Hitherto, in a gear of this kind the driving and driven members have consisted of toothed wheels driven by a chain and the relative displacement of the two-toothed wheels has been affected when resistance occurs owing to the additional stress produced on the chain which causes the wheels to approach one another and thus effects a reduction in the transmission ratio. With this arrangement a tensioning pulley is necessary in order to take up the slack in the chain and further the member which is carried by the resilient member must be the driving member and it is impossible to invert the driving and driven members. These disadvantages, among others, are obviated by the present invention.

According to the invention, the driving and driven members are parallel shafts one of which is mounted so as to be caused to approach the other by increased load against the action of a control spring. With this arrangement the drive need not necessarily be effected by means of a chain and further either the driving member or the driven member may be the member which is resiliently supported.

According to a preferred form of construction, one end of each drag link is pivoted by means of a pin near to the periphery of a disc which is rigidly connected to one of the shafts, while the other end is slidably guided, in or near the suitably formed periphery of a disc which is rigidly connected to the other shaft, in such a manner that the individual links come into action in succession and are then disengaged, by over-running the disc, as soon as the next link has arrived in a position in which it transmits the power. In this way, the angle subtended by two successive points of engagement and the angular velocity of the one shaft relatively to the other shaft is varied in accordance with the relative eccentricity of the two shafts.

A transmission gearing in accordance with the invention is illustrated diagrammatically and by way of example in the accompanying drawings, in which Fig. 1 is a diagram showing the two rotating discs with five connecting links between them in two different relative positions, the concentric position being illustrated in dotted lines and the eccentric position in full lines;

Fig. 2 is a vertical section through the plane of the two shafts;

Fig. 3 is a part section on a larger scale through the central plane of the disc, the connecting links being shown in side elevation;

Fig. 4 is a corresponding vertical cross section of the same disc and through the operating end of a connecting element;

Fig. 5 is a view on the said edge and the said connecting element partially sectioned in a longitudinal sense;

Figure 6:
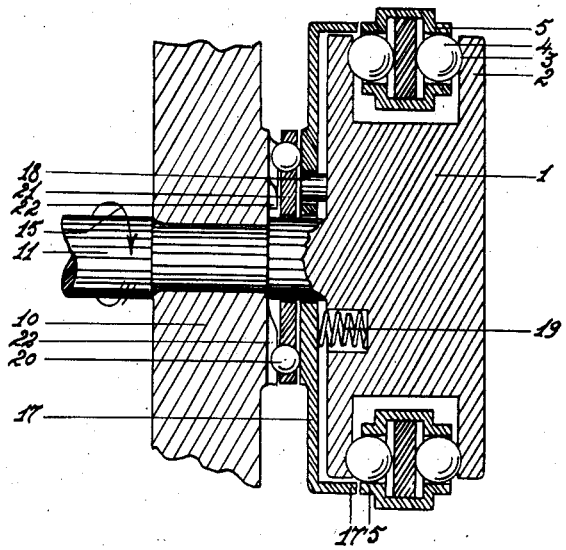
Fig. 6 shows a portion of a section like Fig. 2 with back pedalling brake.

In the form of execution shown in the drawings the disc 1, fixed in the shaft 1', is provided with two edges 2 which have on their inner opposite sides an arched groove, the centres of each arch being at the same distance from the axis of rotation.

In the grooves 3 roll the balls 4 carried by guide blocks 5 on the tapered head 6 of the connecting rods 7, which have on their opposite end the boxes 8 by means of which they are swinging on the pins 8', which are fixed on the periphery of the disc 9; small springs 10 tend to push the whole of the blocks 5 with the balls 4 towards the ends of the heads 6 which are enlarged.

The shafts 1' and 9' are mounted on the bearings 10 and 11.

The bearing 10 is integral with the base 12, whereas the bearing 11 is slidable so as to allow the displacement of the shaft 9' in an eccentric position relative to the shaft 1' and is guided in the slide 13 which also is integral with the base 12.

The spring 14 tends to bring the whole of the support 11, the shaft 9' and the disc 9 to the position of greatest eccentricity.

The operation of this transmission gear is as follows:

Assuming the disc 1 to be the driving disc and the disc 9 to be the driven disc and assuming the sense of the rotation to be as indicated by the arrow 15, the balls 4 will be clamped between the heads of the rods 6 and the grooves 3 by the push of the springs 16 and by the friction of the balls between the wedged surfaces and the grooves 3.

The disc 1 carries along the rods 7 in its motion and the rods draw along the disc 9.

If the relative position of the two shafts 1' and 9' is the concentric position, the connecting rods 7 will maintain their angular position unchanged in respect of the discs 1 and 9 during rotation.

If their relative position is an eccentric one, a series of oscillations of the rods 7 on their pins 8' and on the other side on the balls 4 will take place during the rotation.

Thus the continuous connection between the disc 1 and the disc 9 is ensured whatever the relative position of their axes of rotation may be.

Figure 1 shows how in the coaxial position all of the connecting elements 7 maintain equal distances between the engagement points of these balls 4 on the periphery of the disc 1. On the contrary in the eccentric positions distances of the said engagement points should be varying between a minimum and a maximum at any revolution of the disc 1 and these oscillations correspond to analogous variations of the speed of the rod heads 6 relative to the constant peripheric speed of the disc 1. In view of these variations of speed of the head 6 relative to the periphery of the disc 1, it occurs that on the side towards the eccentric shaft 9' the peripheral speed of the disc 1 is higher than the speed of the heads 6, and vice versa on the opposite side this speed is lower.

Therefore in the first zone an automatic engagement will take place as the balls 4 will be clamped between the edges 2 and the conical heads 6. The rod being engaged will take up the peripheral speed of the disc 1 and will therefore transmit a speed acceleration to the disc 9.

In this manner a continuous series of impulses will be transmitted, and the zone of engagement between the heads 6 and the disc 1 will be shorter, with consequent stronger acceleration, the higher the degree of relative eccentricity between the two axes of rotation.

Outside of the zone of engagement, the speed of the heads 6 being higher than the peripheric speeds of the disc 1, the balls 4 are automatically disengaged and move freely in the grooves 3.

It will be evident from the drawings that when the rods are engaged on the side of the eccentricity the traction stress exercised by the disc 1 on the rods 7 is divided in two forces of which the one has a tangential direction and transmits the rotation, whereas the other is directed radially and equilibrated by the reaction of the bearings 10 and 11 which are supported on the base 12.

If between one of the said bearings, for instance the support 11, and the base plate 12 a yielding means (for example the spring 14) is interposed and pushes the support towards the eccentric position, the spring will react against the foresaid radial component force. Therefore the greater the resistance opposed by the disc 9 to the motion, the greater will be the force of reaction asked for from the spring 14 which will be deformed until it gives this reaction. But by squashing the spring 14 the degree of eccentricity of the two shafts is diminished and therefore also decreases the ratio of acceleration of the system of transmission until the equilibrium between the transmission ratio and the resistance to be overcome is obtained without the intervention of further controlling members.

The mechanism as described and shown in the Figures 1 to 5 is for free wheel bicycles. In this case the disc 1 will only transmit the movement when rotating in the sense of the arrow in Fig. 3, whereas when rotating in the opposite sense no transmission takes place. But in the case of application of a back pedalling brake to the bicycles a transmission is necessary. In the Figures 6 to 8 of the drawings there is therefore shown as an example a mechanism with automatically variable ratio of transmission, in which when the disc 1 is rotated against the sense of the arrow 15 a transmission of this movement to the disc 9 is also obtained at such a degree as is, for example, sufficient in bicycles with back pedalling brake.

In the form of execution shown in Fig. 6 the disc 1, which is at a little distance from the support 10, bears the disc 17 having a projecting edge 17' capable of being pushed at contact into the blocks 5 and to exercise a strong pressure on these blocks.

The disc 17 revolves together with the disc 1, being connected to it by three or more pins 18 placed equidistantly and concentrically around the shaft fixed on the said disc 1, and corresponding to bores in the disc 17.

With the pins 18 are alternated springs 19 engaged into holes of the disc 1 and pressing on the disc 17. Between the disc 17 and the support 10 there are placed 3 or more balls 20 guided by a ring 21 rotatable on the shaft 1'. On the adjacent face of the support 10, in a position corresponding to the balls 20 and in the same number, helicoidal surfaces 22 are provided having the shape illustrated in Fig. 7 in which for sake of clearness they are developed.

Figure 8:
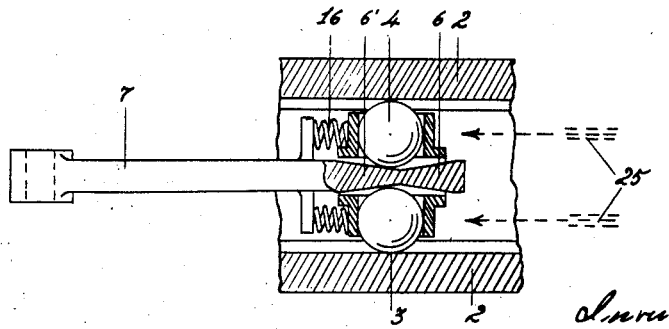
Fig. 8 shows the device according to Fig. 5 adapted for bicycles with back pedalling brake.

In the form of execution shown in Fig. 8, the small connecting rods are provided on their heads with surfaces inclined in two senses, that is to say towards their end at 6 and towards their stem at 6'.

Figure 7:
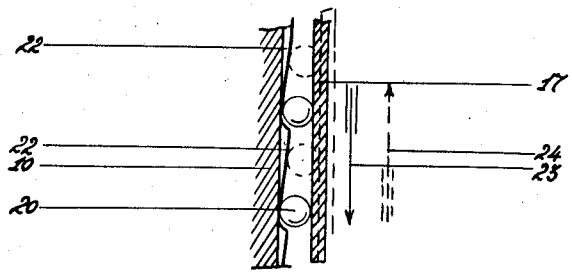
Fig. 7 shows a detail of the mechanism according to Fig. 6.

The operation of the device in this latter form is as follows:

When pedalling in the normal sense, the disc 1 rotates in the sense of the arrow 15 in Fig. 6 corresponding to the arrow 23 in Fig. 7 and the whole mechanism is operating as already described with reference to the Figures 1 to 5 as the disc 17 under the pressure of the springs 19 compels the balls 20 to remain on the low ground of the surfaces 22 and therefore detached from the disc 1 and not pressing on the disc 17 (full lines in Fig. 7). The edges 17', as shown also in Fig. 6, are not contacting with the blocks 5. If the disc 1 is stopped the disc 9 is capable to rotate by inertia. When pedalling backwards, the disc 1 rotates in the opposite sense, that is to say the disc 17 in Fig. 7 rotates in the sense of the arrow 24 and being pressed by the springs 19 on the balls 20 compels the balls to rise on the high portions of the surfaces 22. The balls 20 will push the disc 17 against the action of the springs 19 to press edge 17' on the blocks 5.

By the action of this pressure the guide-blocks 5 are dragged by the disc 17 in the sense of the arrow 25 of Fig. 8 and overcome the force of the springs 16. The balls 4 are squeezed between the flanges 2 of the disc 1 and the conical surfaces 6' of the connecting rods 7, thereby transmitting movement in this sense of rotation for some portion of the revolution, which is sufficient for example to apply the brake in bicycles with back pedalling brake.

By rotating afterwards the disc 1 again in the normal positive sense of the arrow 15, the disc 17 by the action of the springs 19 allows the balls 20 to go on the ground of the surface 22, and the edges 17' free the blocks 5 which under the action of the springs 16 will return in their normal position.

What I claim is:

A variable speed gear comprising a rotary driving member, a rotary driven member and means connecting them comprising a plurality of drag links in which the ratio of transmission is automatically varied by relative displacement of the two members from a position of maximum eccentricity, corresponding to a maximum ratio of transmission, through intermediate eccentric positions into a concentric position, a spring carrying one of said members and tending to hold it in the position of greatest eccentricity which is deformed in accordance with the resistance to be overcome and thus varies the relative eccentricity of the two members, the driving and driven members being parallel shafts one of which is so mounted as to be caused to approach the other by increased load against the action of the said spring, said drag links being so constructed and arranged that either the driving or the driven member may be supported by the resilient member, and means upon one of said members for gripping said drag links.

ALVARO VINCENZONI.